UNITED STATES PATENT OFFICE.

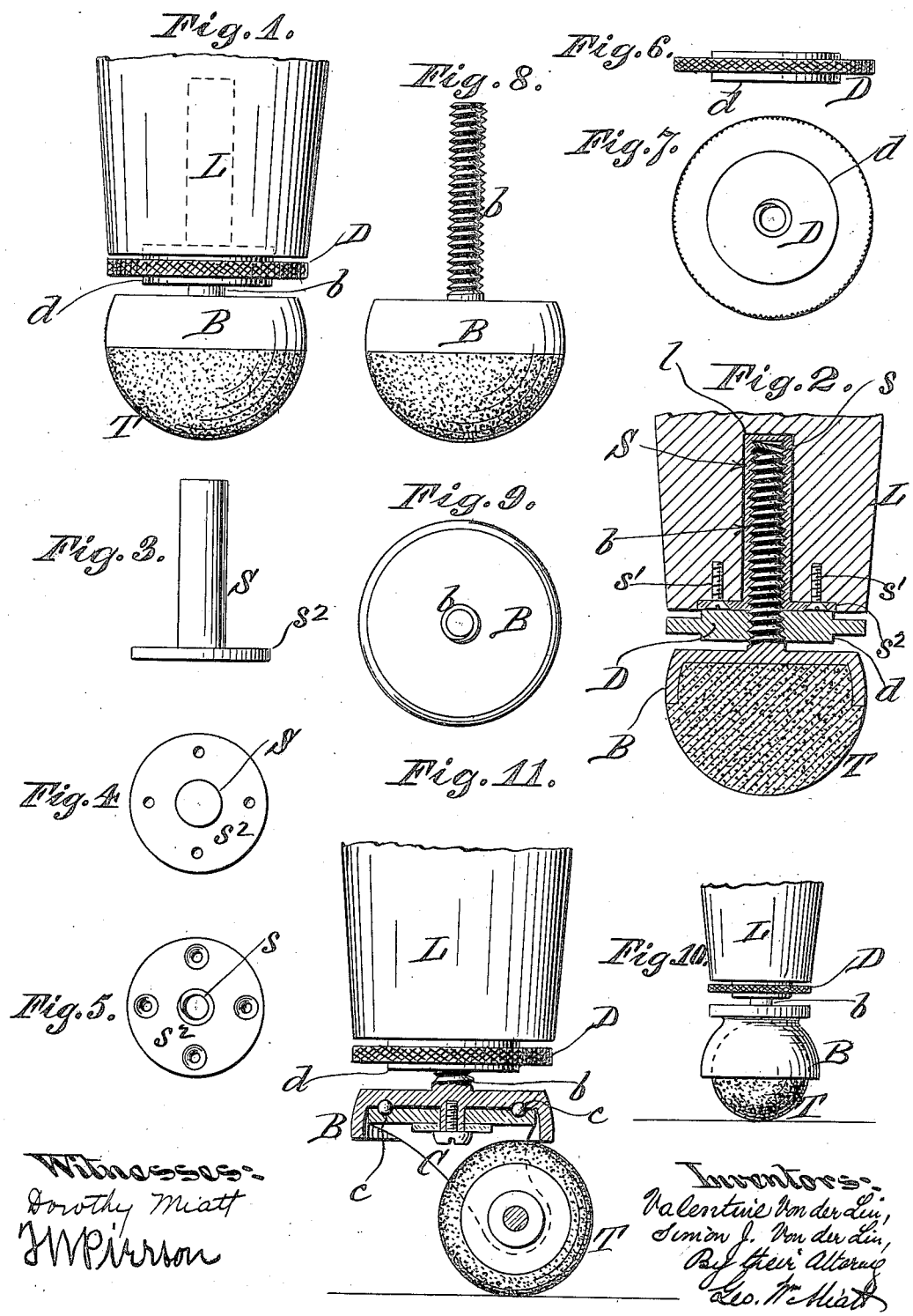

VALENTINE VON DER LIN AND SIMON J. VON DER LIN, OF NEW YORK, N. Y.

FURNITURE-TREAD.

1,123,960. Specification of Letters Patent. Patented Jan. 5, 1915.

Application filed March 6, 1914. Serial No. 822,969.

*To all whom it may concern:*

Be it known that we, VALENTINE VON DER LIN, a citizen of the United States, and SIMON J. VON DER LIN, a native of Germany, having declared his intention of becoming a citizen of the United States, both residents of the borough of Manhattan, city, county, and State of New York, have invented certain new and useful Improvements in Furniture - Treads, of which the following is a specification.

Our present invention, like that set forth in our concurrent application, Serial No. 820,419 filed Feb. 24th, 1914, is designed to afford simple but effective means whereby furniture supports may be adjusted to compensate for irregularities in floor surface, &c., the distinctive feature in said concurrent application being a rotatable adjusting sleeve engaging with a peripherally threaded tread, movable vertically upon, but not rotatable upon, a central guide post.

Our present invention consists in the specific construction and arrangement of parts herein described and claimed,—a distinguishing feature being a tread base plate formed with an adjustable screw spindle engaging with a threaded socket piece in the furniture leg or support, in conjunction with a binding nut-disk on the screw spindle adapted to hold the tread base plate in a prescribed position with relation to said support, all as hereinafter fully set forth.

In the accompanying drawings, Figure 1, is an elevation of the lower part of the leg of a table or other article to which our adjustable tread is applied; Fig. 2, a central vertical sectional elevation thereof; Fig. 3, is a side elevation of the socket piece; Fig. 4, a top view and Fig. 5, a bottom view thereof; Fig. 6, an edge elevation of the nut disk; Fig. 7, a view of the upper or under side thereof; Fig. 8, is a side elevation of the spindle screw, tread base plate and tread; Fig. 9, a top view of the same; Fig. 10, is a side elevation of a modification in which the tread is in the form of a ball rotatably mounted in the base plate; Fig. 11, is a sectional elevation of a modification in which the tread is in the form of an anti-friction caster roller.

In the drawings L, represents a leg or support of any article of furniture. If this support is metallic, or of very hard wood or other suitable material, the female socket screw $s$ may be tapped directly thereon, in which case the support itself will be the socket piece; but we prefer for ordinary purposes to provide a metallic socket member S, as a constituent part of our device, said socket piece being formed with the internal female screw thread $s$, and being adapted for insertion in a recess or mortise $t$, formed for its reception in the end of the support L. It may be rigidly secured in position in the leg L, by any appropriate means, as by screws $s'$, $s'$, passing through the annular lip flange $s^2$, as shown in Fig. 2. In either case the function of the screw socket is to afford means for engagement with the screw post or spindle $b$, attached to the tread base B,—to which the tread T, is in turn attached.

The base plate B, is integral with the spindle screw $b$, and affords a convenient means of turning the latter on its longitudinal axis to effect the vertical adjustment of the tread T, whether the tread is rigid thereon and incapable of independent movement as in Figs. 1, 2 and 8; in the form of a ball rotatable in a socket in the under side of the base as in Fig. 10; or where the tread is in the form of a caster roller as in Fig. 11, in which latter case the caster plate C, in which the wheel tread T, is mounted is pivotally secured to the lower end of the tread base plate B, in such manner as to be rotatable thereon to allow the caster wheel tread T, to adapt itself in travel to the line of least resistance, or in other words to conform to the line of motion. In this latter case the usual anti-friction rollers $c$, may be interposed between the under side of the base plate B, and the upper side of the bearing plate C, on which the tread roller T, is mounted.

In order to lock the parts positively in prescribed positions with relation to each other, as after an adjustment to conditions and requirements has been effected by positioning the screw post $b$, vertically within the socket member S, we provide a lock-nut-disk D, upon the screw spindle $b$, between said socket member S, and the tread base plate B. This disk nut D, is preferably of a diameter sufficient to protrude slightly beyond the lower edge of the leg or support L, so as to be conveniently accessible for the fingers; and its central portion $d$, may be of greater thickness than the peripheral portion of the disk D, to afford ample screw connection with the screw spindle $b$, and also to afford a contact bearing with the socket flange $s^2$, when screwed home against the latter to lock the spindle $b$, in a desired position against longitudinal movement in either direction.

The operation of our device will be readily understood. If it is desired to adjust the tread T, either up or down as related to the support L, and the floor or other surface against which the tread is designed to rest, the disk nut D, is turned down away from the socket member S, and the screw spindle turned either up or down according to the adjustment required, the base plate B, being used as a finger piece. When the tread T, contacts properly with the floor or other supporting surface, the disk-nut D, is again jammed up against the socket piece S, thereby locking the parts in the new and desired relationship.

It will be seen that this construction and arrangement of parts is very simple and inexpensive; that there are no parts protruding beyond the tread base plate; and that the use of a wrench or extraneous tool is dispensed with in effecting the adjustment of the parts.

As in our concurrent application hereinbefore referred to we use the term "tread" in a general sense, meaning any floor or surface contacting means attached to the tread base plate B. With this understanding

What we claim as our invention and desire to secure by Letters Patent is,

1. The furniture tread herein described comprising a base plate having rigid therewith upon one side a screw threaded spindle and upon the opposite side means for securing a tread, a threaded socket piece having an annular lip flange with means for securing it to a leg, a tread carried by the under side of said base plate, and a lock-nut disk into which said spindle is screw threaded, said disk being disposed between said flange and the base plate.

2. The furniture tread herein described, comprising a base plate having rigid therewith upon one side an adjustable screw spindle and upon the opposite side means for securing a tread, a threaded socket piece having an annular lip flange with means for securing it to the leg, a tread carried by said base, and a lock-nut disk into which said spindle is screw-threaded, said disk being interposed between said flange and the base and having its peripheral portion reduced in thickness and protruding slightly beyond the lower edge of the leg for convenience of manipulation.

VALENTINE von der LIN.
SIMON J. von der LIN.

Witnesses:
 GEO. WM. MIATT,
 DOROTHY MIATT.